ANALOG PULSE VARIATION DIGITAL-TO-ANALOG CONVERTER

Filed Jan. 18, 1966 Sheet 1 of 3

FIG. I

Irving Brown,
INVENTOR.
BY Harry M. Saragovitz
Edward J. Kelly
Herbert Berl
Alfred E. Smith Irving Brown,
INVENTOR.
BY Harry M. Saragovitz
Edward J. Kelly
Herbert Berl
Alfred E. Smith Irving Brown,
INVENTOR.
BY Harry M. Saragovitz
Edward J. Kelly
Herbert Berl
Alfred E. Smith United States Patent Office 3,454,943

Patented July 8, 1969

3,454,943
ANALOG PULSE VARIATION DIGITAL-TO-ANALOG CONVERTER

Irving Brown, Cherry Hill, N.J., assignor, by mesne assignments, to the United States of America as represented by the Secretary of the Army Filed Jan. 18, 1966, Ser. No. 521,462
Int. Cl. H03k 13/02
U.S. Cl. 340—347 9 Claims

ABSTRACT OF THE DISCLOSURE

A digital-to-analog converter that is controlled by a crystal controlled oscillator whose output controls two separate channels. One of the channels is varied according to the digital input. The two channels control a pulse generator whose output is averaged to provide the analog representation of the digital input.

The device to be described herein may be used as an output converter on all types of digital computers for converting the digital information to an analog voltage corresponding to that information. The high degree of accuracy obtained by the present invention is obtained without requiring extreme accuracy in its components. This has often been a limiting factor in conventional digital-to-analog converters which use resistance dividers.

The principle of operation of the present invention is based on the fact that the average value of a series of flat-topped, straight-sided pulses is given by $$e_{avg}=Et/T \quad (1)$$

where E is the magnitude of the pulse, $t$ is the duration of the pulse, and T is the period of successive cycles. It is obvious that if the voltage E and the period T are kept constant, then the average value will vary linearly with the time $t$. A primary feature of the present invention resides in making the quantity $t$ vary with crystal-controlled accuracy as a linear function of the digital information that it is desired to convert.

It is an object of the present invention to provide a precise digital-to-analog converter having improved accuracy and response time.

A further object of this invention is to provide a digital-to-analog converter that does not require extreme accuracy in its components.

In general my invention provides a digital-to-analog converter for converting digital information to an analog voltage by generating a series of pulses having a constant magnitude and period; varying the duration of the pulses as a linear function of the digital information that it is desired to display or otherwise use; and averaging the output of the pulse generator to provide the desired analog voltage.

For a full understanding of the present invention together with other objects and advantages thereof, reference should be made to the accompanying drawing and to the following detailed description to be read in conjunction therewith, in which.

Figure 1:
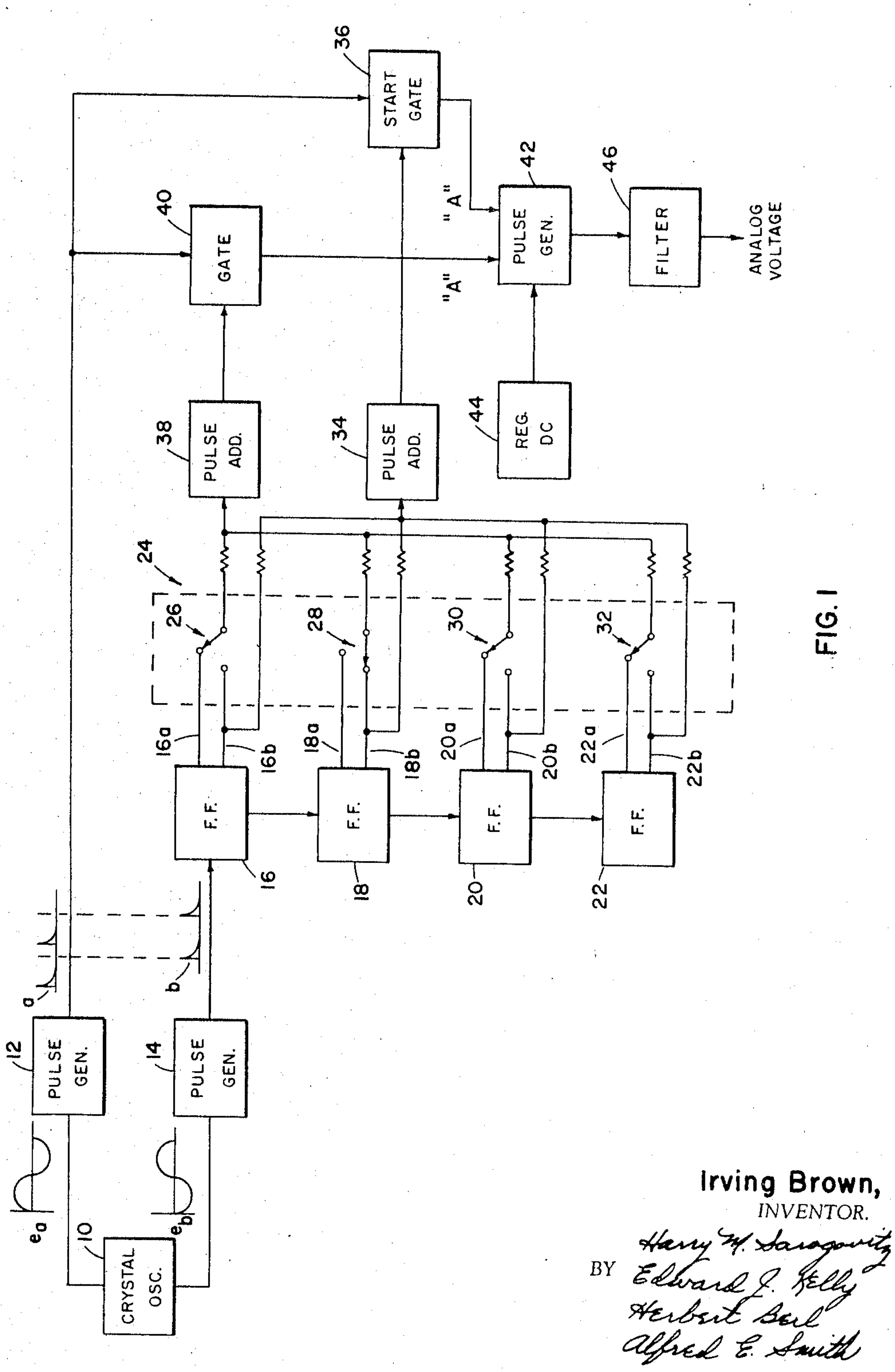
FIGURE 1 is a block diagram representation of a preferred embodiment of the invention.
Figure 2:
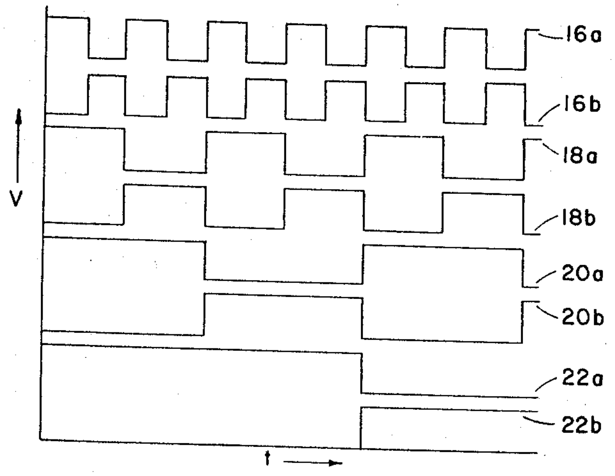
FIGURE 2 is an illustration of the output waveforms of the flip-flops of FIGURE 1.

Referring now to the drawing, and FIGURE 1 in particular, the first embodiment of the invention includes circuits for varying the duration of a series of pulses that includes a crystal-controlled oscillator 10 having first and second sine wave outputs $e_a$ and $e_b$. The sine wave outputs control first and second pulse, or pip, generators 12 and 14 which generate "*a*" and "*b*" pips respectively. Pulse generator 14 is connected to a series of flip-flop circuits 16, 18, 20 and 22 which are arranged as a binary scale-of-two divider. (Note the flip-flop output waveforms in FIGURE 2.) It should be noted that the scale of two is not an essential factor. What is important is that the scale, or code, be the same as that used to represent the digital number to be converted. The digital information source 24 is represented here as a series of switches 26, 28, 30 and 32. The symbolism of a switch is used here in a general sense and could be, in practice, relay contacts, manual settings, or an electronic gate. The negative outputs of the flip-flops are connected to a second pulse adder 34 which is connected to a start gate circuit 36 and the outputs of the switches are connected to a first pulse adder 38 which is connected to a second gate circuit 40.

The pulses that are to have their duration varied in accordance with the digital information are provided by pulse generator 42.

In order to obtain the desired analog voltage from the output of pulse generator 42 a means for averaging the output pulses therefrom is provided in the form of a filter 46.

In operation consider the crystal-controlled oscillator 10 delivering two output signals: $e_a=E_m \sin \omega t$ and $e_b=-E_m \sin \omega t$. These outputs are fed to pulse generators 12 and 14 which generate sharp pips each time the sine waveforms cross zero in a positive direction. The "*b*" pips from generator 14, which occur midway between the occurrences of the "*a*" pips from generator 12, are used to trigger flip-flops 16, 18, 20 and 22. Each of the flip-flops delivers both its positive and negative output square waves (**16*a*, 16*b*, 18*a*, 18*b*, 20*a*, 20*b*, 22*a* and 22*b*) to the terminals of switches 26, 28, 30 and 32. Each switch represents one bit in a binary word, and, depending on its position, may indicate a 1 or 0. The pattern of switch states represents the digital word which is to be converted to analog form. The signals appearing at switches 26, 28, 30 and 32 are added in a first pulse adder 38. The output of the first pulse adder 38** is shown in FIGURE 3 and it corresponds to the particular selection of pulses made by the switch pattern in FIGURE 1.

Figure 3:
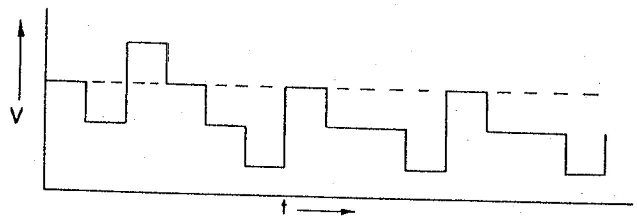
FIGURE 3 illustrates the output waveform of the pulse adder of FIGURE 1.

Note that at one time the waveform of FIGURE 3 exceeds the dashed line. This observation can be extended to the generality that for each unique combination of switch positions there is one, and only one, period in time when the added waveforms will exceed a certain value. It can be noted here that an "and" gate could be substituted for the first pulse adder 38 and the same result would be achieved when there is coincidence of all the positive selected waveforms.

In effect, what has been accomplished by the above procedure is to select one certain interval of time between two "*b*" pips. This interval of time is used to "gate-through" the particular "*a*" pip which occurs there. This amounts to forming a gate from that portion of the waveform of FIGURE 3, the output of adder 38, which exceeds the predetermined value. It is seen that the time of occurrence of the "*a*" pip at the output of gate 40 is a crystal controlled quantity and depends only on the pattern of the positions of the switches in digital source 24.

Next, the negative phases of all the flip-flop output square waves 16$b$, 18$b$, 20$b$ and 22$b$ are added in second pulse adder 34 without passing through the switches. The selected interval of time which results from this addition is therefore, always the same one, as is the corresponding "$a$" pip at the output of gate 36.

Thus, two "$a$" pips are selected. One of these, the output of gate 36 is stationary in time, occurring repetitively at the same point. The other "$a$" pip, the output of gate 40, occurs in time as a function of the positions of switches 26, 28, 30 and 32. The first "$a$" pip is used as a start pulse for pulse generator 42 to turn on a pulse wave, while the latter, the output of gate 40, turns the pulse generator off.

The magnitude of the square wave output of generator 42 is maintained at some regulated voltage by regulated voltage source 44 while the bottom is held at zero potential. The output of pulse generator 42 is passed through filter 46 to obtain the desired analog voltage.

Figure 4:
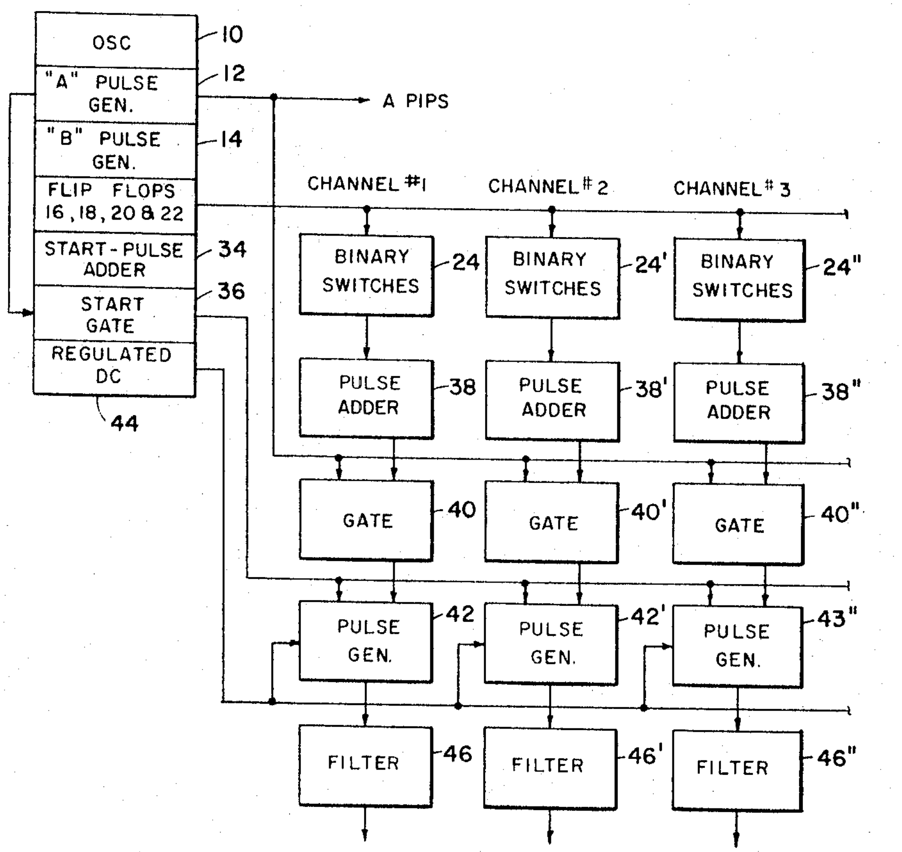
FIGURE 4 is a block diagram representation of a second embodiment of the invention including multiple channels of conversion.

An important feature of the present invention is that if many digital words are to be converted to analog voltages, then some of the equipment can be common to many channels of conversion. A three channel converter is shown in FIGURE 4 wherein the crystal controlled oscillator 10, pip generators 12 and 14, flip-flops 16, 18, 20 and 22, adder 34, gate 36 and the regulated voltage supply 44 are common to all conversion channels 1, 2, and 3.

The operation of the three channel converter is identical with that of the single channel converter of FIGURE 1 and further discussion is believed unnecessary.

It is apparent that the assumed constant value of E, the output pulse from pulse generator 42, can only be as good as practical limitations permit. Any percentage error or drift in this voltage appears as the same percent error in the output analog voltage unless some means is provided for compensation. It is obvious that a change in pulse amplitude can be tolerated provided the pulse duration is changed to keep the total area under the pulse nearly constant. If E is the original pulse amplitude, ΔE is an error due to drift, $t$ is the original duration of the pulse, then $\Delta t$ is the compensation that must be introduced to keep the pulse area nearly constant.

For constant area pulses $$Et=(E+\Delta E)(t-\Delta t) \quad (2)$$

$$\frac{\Delta t}{t}=\frac{(\Delta E)}{E}\frac{1}{\left(1+\frac{\Delta E}{E}\right)} \quad (3)$$

From this it can be seen that the percentage change in $t$ is almost equal to that in E. For most practical cases, E can be held to within ½% or better. In a system wherein $\Delta t/t=\Delta E/E$ the residual error would be due to the factor $1+\Delta E/E$ in the denominator of Equation 3. Expansion of this equation shows more clearly:

$$Et=Et+t\Delta E-E\Delta t-\Delta E\Delta t \quad (4)$$

If the percent error in $t$ is introduced equal and opposite to that of E, the second and third terms of Equation 4 cancel and the residual error is $\Delta E\Delta t$. In other words if E is held to within 0.1% error the error in the D.C. analog voltage would be 0.01%.

Figure 6:
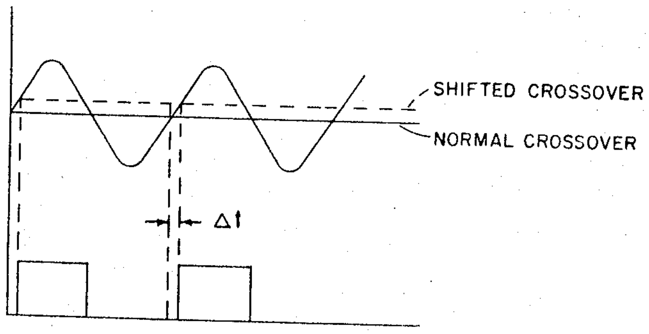
FIGURE 6 illustrates waveforms associated with the circuit of FIGURE 5.
Figure 5:
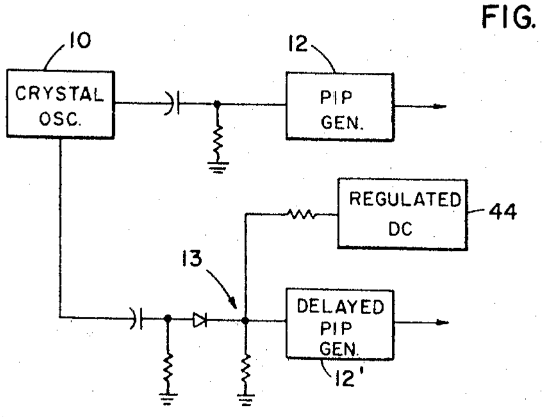
FIGURE 5 is a schematic diagram of a circuit for compensating the converter for drift errors.

The circuitry for providing the needed compensation is shown in FIGURE 5. In addition to the "$a$" pip generator 12 a second "$a$" pip generator 12' is provided which operates the same as generator 12 but delays the pip generation until the sine wave crosses a small positive voltage. This positive voltage is derived via a resistance divider 13 from the regulated voltage source 44 which controls the amplitude of the output from generator 42. The output from pip generator 12' is applied to gate 36 to start the square wave output from generator 42, and the un-delayed pulse from generator 12 is applied to gate 40. The period T remains constant because the same delay is introduced in each cycle. The un-delayed "$a$" pip which is selected by the switch pattern is unaffected by the compensation and the net result is a pulse whose width varies inversely as the height as shown in FIGURE 6.

While this invention has been described with reference to particular embodiments thereof it is obvious that various changes may be made in details within the scope of the invention. Accordingly I desire the scope of my invention to be limited only by the appended claims.

I claim:

1. A digital-to-analog converter for producing an analog representation of digital information comprising: a pulse generator providing a series of pulses having a constant magnitude and a constant period; means for varying the duration of said pulses as a linear function of the digital information to be converted; means responsive to the output of said pulse generator for providing the analog equivalent of said digital information; wherein said pulse duration varying means includes an on channel for turning said pulse generator on, an off channel for turning said pulse generator off, and a crystal controlled oscillator connected to said on and off channels for generating voltage pips thereto wherein the voltage pips to said off channel occur midway between the occurrence of the pips to said on channel and said crystal controlled oscillator furnishes control of said on and off channels.

2. A digital-to-analog converter as set forth in claim 1 wherein said on channel comprises: a first pip generator connected to said oscillator; and a first gate circuit having a first input connected to said first pip generator and an output connected to a first input of said pulse generator.

3. A digital-to-analog converter as set forth in claim 2 wherein said off channel comprises: a second pip generator connected to said oscillator; a binary scale-of-two divider connected to the output of said second pip generator; a digital information source connected to the output of said scale-of-two divider; a first pulse adder connected to said digital information source; and a second gate circuit having a first input connected to the output of said first pulse adder and an output connected to a second input of said pulse generator, said second gate circuit having a second input connected to said first pip generator output.

4. A digital-to-analog converter as set forth in claim 3 wherein said binary scale-of-two divider comprises a plurality of series connected flip-flop circuits each having a positive and a negative output.

5. A digital-to-analog converter as set forth in claim 4 wherein said digital information source comprises a plurality of two position switches whereby said flip-flop positive and negative outputs can be selectively connected to the input of said first pulse adder.

6. A digital-to-analog converter as set forth in claim 5 and further including a second pulse adder having an input connected to each of said flip-flop negative outputs and an output connected to a second input of said first gate circuit.

7. A digital-to-analog converter as set forth in claim 6 and further including a regulated D.C. voltage supply connected to a third output of said pulse generator for maintaining the magnitude of said generator output pulses constant.

8. A digital-to-analog converter as set forth in claim 1 wherein said on channel comprises: a first pip generator connected to said oscillator; a delayed pip generator means connected to said oscillator; and a first gate circuit having an input connected to said delayed pip generator and an output connected to a first input of said pulse generator, said off channel comprises a second pip generator connected to said oscillator; a binary scale-of-two divider connected to the output of said second pip generator; a digital information source connected to the output of said scale-of-two divider; a first pulse adder connected to said digital information source; and a second gate circuit having a first input connected to the output of said first pulse adder and an output connected to a second input of said pulse generator, said second gate circuit having a second input connected to said first pip generator.

9. A digital-to-analog converter as set forth in claim 8 including a plurality of conversion channels and wherein said crystal controlled oscillator, said first and second pip generators, said flip-flop circuits, said first pulse adder, said first gate circuit and said regulated voltage supply to said plurality of conversion channels.

References Cited

UNITED STATES PATENTS 3,263,066 7/1966 Seegmiller -------- 340—347 X

MAYNARD R. WILBUR, *Primary Examiner.*

MICHAEL K. WOLENSKY, *Assistant Examiner.*